[19] United States Patent
Treutlein et al.

[11] Patent Number: 5,028,639
[45] Date of Patent: Jul. 2, 1991

[54] WATER DILUTABLE COATING COMPOSITIONS

[75] Inventors: Roland Treutlein, Bergrheinfeld; Bodo Muller, Wurzburg; Peter Mayenfelds, Munster, all of Fed. Rep. of Germany

[73] Assignee: BASF Lacke & Farben AG, Münster, Fed. Rep. of Germany

[21] Appl. No.: 609,060

[22] Filed: Oct. 31, 1990

Related U.S. Application Data

[63] Continuation of Ser. No. 335,965, filed as PCT EP87/00407 on Jul. 29, 1987, published as WO88/01637 on Mar. 10, 1988, abandoned.

[30] Foreign Application Priority Data

Aug. 27, 1986 [DE]  Fed. Rep. of Germany ....... 3629159
Oct. 24, 1986 [DE]  Fed. Rep. of Germany ....... 3636183

[51] Int. Cl.$^5$ ............................ C08K 9/02; C08K 3/08
[52] U.S. Cl. .................................... 523/200; 106/404; 524/441
[58] Field of Search ....................... 523/200; 524/441; 106/404

[56] References Cited

U.S. PATENT DOCUMENTS 2,522,538  9/1950  Rethwisch et al. .
3,085,890  4/1963  Rolles ................................ 524/441
4,490,499 12/1984  Huybrechts ........................ 524/441
4,693,754  9/1987  Kondis ............................... 106/404

FOREIGN PATENT DOCUMENTS

82/02393  7/1982  PCT Int'l Appl. .
1140052  1/1969  United Kingdom .

*Primary Examiner*—Lewis T. Jacobs
*Attorney, Agent, or Firm*—Kenyon & Kenyon

[57] ABSTRACT

The invention relates to water-dilutable coating compositions which contain a binder, an aluminum pigment and an aqueous diluent. The water-dilutable coating compositions according to the invention are distinguished in that they contain, as the aluminum pigment, a pigment which has been obtained by passivating a lubricant-containing aluminum pigment in an aqueous passivating solution which contains chromic acid and a water-soluble glycol ether of the general formula $R^1$—(—O—$CHR^2$—$CH_2$—)$_n$—OH ($R^1$ represents a lower alkyl radical, $R^2$ represents either an H atom or a lower alkyl radical, preferably a —$CH_3$ group, and n represents a number from 1 to 5) and/or a water-soluble glycol of the general formula HO—($CHR^3$—$CH_2$—O—)$_n$H ($R^3$ represents either an H atom or a lower alkyl radical, preferably a —$CH_3$ group, and n represents a number from 1 to 5), at not less than 50° C., preferably 60° to 90° C., particularly preferably about 80° C.

18 Claims, No Drawings

WATER DILUTABLE COATING COMPOSITIONS

This application is a continuation of application Ser. No. 335,965, filed as PCT EP87/00407 on Jul. 29, 1987, published as WO88/01637 on Mar. 10, 1988, now abandoned.

The invention relates to water-dilutable coating compositions which contain a binder, an aluminum pigment and an aqueous diluent.

Water-dilutable coating compositions which contain a binder, an aluminum pigment and an aqueous diluent are known and are to be employed, in particular, in automobile painting for producing metal-effect finishes.

Today, metal-effect finishes are preferably applied by the so-called "base coat/clear coat" process, in which a base coat which is pigmented with aluminum pigments is applied first and is subsequently covered with a clear coat.

A particular problem of aqueous coating compositions for the production of metal-effect finishes is that they frequently have a pH which is so high that the aluminum pigments used react with water, forming hydrogen. This phenomenon gives rise to a number of problems, in particular on storage of the paint materials in sealed containers.

A number of processes have been disclosed with whose helpless aluminum pigments are to be passivated so that only a very small amount of hydrogen evolution occurs, if any at all. However, all these processes have disadvantages, some of which are considerable. Thus, for example, the use of organic stabilizers leads to defects in the paint film (moisture sensitivity, adhesion defects...) due to wetting agent properties, and impairments in color shade and metallic effect (flop) of the metal-effect finishes must be accepted when use is made of known aluminum pigments which are passivated by chromating.

The object of the present invention is to provide water-dilutable coating compositions, of the type mentioned initially, which do not have the abovementioned disadvantages of the state of the art.

This object is achieved according to the invention by means of water-dilutable coating compositions of the type mentioned initially, which contain, as aluminum pigment, a pigment which has been obtained by passivating a lubricant-containing aluminum pigment in an aqueous passivating solution which contains chromic acid and a water-soluble glycol ether of the general formula $R^1$—(—O—CHR$^2$—CH$_2$—)$_n$—OH ($R^1$ represents a lower alkyl radical, $R^2$ represents either an H atom or a lower alkyl radical, preferably a —CH$_3$ group, and n represents a number from 1 to 5) and/or a water-soluble glycol of the general formula HO—(CHR$^3$—CH$_2$—O—)$_n$H ($R^3$ represents either an H atom or a lower alkyl radical, preferably a —CH$_3$ group, and n represents a number from 1 to 5), at not less than 50° C., preferably 60° to 90° C., particularly preferably about 80° C.

The water-dilutable coating compositions according to the invention can, in principle, contain all binders which are suitable for water-dilutable coating compositions. Examples which may be mentioned are water-dilutable polyester, polyacrylate, polyurethane or aminoplast resins. Water-dilutable coating compositions whose binders comprise at least partly a water-dilutable polyurethane resin are preferred.

The water-dilutable coating compositions according to the invention contain aluminum pigments which have been obtained by passivating a lubricant-containing aluminum pigment in an aqueous passivating solution which contains chromic acid and a water-soluble glycol ether of the genera; formula $R^1$(—O—CHR$^2$—CH$_2$)$_n$OH ($R^1$ represents a lower alkyl radical, $R^2$ represents either an H atom or a lower alkyl radical, preferably a —CH$_3$ group, and n represents a number from 1 to 5) and/or a water-soluble glycol of the general formula HO—(CHR$^3$—CH$_2$—O—)$_n$H ($R^3$ represents either an H atom or a lower alkyl radical, preferably a —CH$_3$ group, and n represents a number from 1 to 5), at not less than 50° C., preferably 60° to 90° C., particularly preferably about 80° C.

Surprisingly, usable pigments are only obtained when the aluminum pigment to be passivated still contains the lubricant which is necessary for the preparation of the pigment. In order to obtain pigments having the desired properties, pigments must be employed which have a certain minimum lubricant content. The lubricant content is preferably adjusted during the preparation process for the aluminum pigments. The minimum content required is dependent both on the nature of the lubricant and on the type of the aluminum pigments employed, and can be determined rapidly by those skilled in the art with the aid of a few preliminary experiments.

Aluminum pigments which contain fatty amines as lubricants lead to passivated pigments which have very particularly advantageous properties. Fatty amines are taken to mean mixtures of long-chain, mainly primary alkylamines which have been obtained, for example, by reduction of fatty acids via the corresponding nitriles.

The lubricant-containing aluminum pigments employed are generally known and customary aluminum pigments which comprise aluminum or aluminum alloys, preferably pure aluminum. Leaf-form aluminum pigments are preferably used. The aluminum pigments can be employed in the form of the commercially available pastes without further pretreatment.

Passivation of the lubricant-containing aluminum pigments is carried out at not less than 50° C., preferably 60° to 90° C., particularly preferably about 80° C., in an aqueous solution which contains chromic acid and a water-soluble glycol ether of the general formula $R^1$—(—O—CHR$^2$—CH$_2$—)$_n$—OH ($R^1$ represents a lower alkyl radical, $R^2$ represents either an H atom or a lower alkyl radical, preferably a —CH$_3$ group, and n represents a number from 1 to 5), and/or a water-soluble glycol of the general formula HO—(CHR$^3$—CH$_2$—O—)$_n$H ($R^3$ represents either an H atom or a lower alkyl radical, preferably a —CH$_3$ group, and n represents a number from 1 to 5).

In addition, the aqueous solution can contain further additives, such as, for example, fluorides or phosphates, which have a positive effect on the chromating process.

Particularly good results are obtained when the passivating solution contains chromic acid and n-butyl glycol (CH$_3$—(CH$_2$)$_3$—O—CH$_2$—CH$_2$—OH).

Both the chromic acid concentration and the glycol ether or glycol concentration can be varied within broad limits. The passivating solution according to the invention generally contains at least 1.5, preferably 1.5 to 4.0, particularly preferably 2.0%, by weight of chromic acid and 3 to 30, preferably 7 to 15, particularly preferably 10%, by weight of water-soluble glycol ether and/or water-soluble glycol.

The passivation is preferably carried out in the freshly prepared passivating solution and is generally complete after 10 to 30 minutes.

After completion of the passivation, the passivated pigment obtained is separated from the passivating solution and washed thoroughly with water. The passivated aluminum pigment thus obtained can then be incorporated into water-dilutable coating compositions by generally known methods.

The water-dilutable coating compositions according to the invention contain an aqueous diluent, which is taken to mean water which can also contain, if appropriate, organic solvents.

Besides a binder, an aluminum pigment and an aqueous diluent, the coating compositions according to the invention can also contain further generally known additives, such as, for example, nonmetallic pigments, flow assistants and leveling auxiliaries.

The water-dilutable coating compositions according to the invention are preferably used as base coating compositions for the production of "base coat/clear coat" metal-effect finishes. They exhibit excellent stability to hydrogen evolution and give metal-effect finishes which are comparable in their optical (flop, color shade etc.) and technological (moisture insensitivity, condensation resistance, intermediate adhesion ... ) properties to finishes prepared using conventional (i.e. containing exclusively organic solvents as diluents) base coating compositions.

The use of the coating compositions according to the invention is not limited to automobile painting. Other substrates, comprising optionally pretreated metal, wood, plastic or the like, can be coated using the one-coat or multicoat method.

The invention also relates to a process for the preparation of aluminum pigments which can be employed in water-dilutable coating compositions, wherein a lubricant-containing aluminum pigment is passivated in an aqueous passivating solution which contains chromic acid and a water-soluble glycol ether of the general formula $R^1$—(—O—$CHR^2$—$CH_2$—)$_n$—OH ($R^1$ represents a lower alkyl radical, $R^2$ represents either an H atom or a lower alkyl radical, preferably a $CH_3$ group, and n represents a number from 1 to 5) and/or a water-soluble glycol of the general formula HO—(CH$R^3$—$CH_2$—O—)$_n$H ($R^3$ represents either an H atom or a lower alkyl radical, preferably a —$CH_3$ group, and n represents a number from 1 to 5), at at least 50° C., preferably 60° to 90° C., particularly preferably about 80° C.

The process according to the invention is carried out by passivating the aluminum pigment to be passivated in the passivating solution at at least 50° C., preferably 60° to 90° C., particularly preferably about 80° C., without further pretreatment, i.e. in particular, without removing the lubricant which is necessary in the pigment preparation process.

The presence of the lubricant is essential for successfully carrying out the process.

Pigments having very particularly good properties are obtained when aluminum pigments which have been prepared using fatty amines as lubricants are employed.

Further details on the process conditions can be gathered from the text above.

The aluminum pigments prepared by the process according to the invention are outstandingly suitable for use in water-dilutable coating compositions (cf. the text above).

The invention is described below in greater detail with reference to an illustrative embodiment.

PREPARATION OF A PASSIVATING SOLUTION 2 parts by weight of $CrO_3$ are placed in a stainless steel or plastic vessel and dissolved in 90 parts by weight of hot distilled water. 10 parts by weight of n-butyl glycol are added to this hot chromic acid solution, and the mixture is stirred briefly (pH of the passivating solution about 0).

PASSIVATION OF THE ALUMINUM PIGMENT

The leaf-form aluminum pigment to be passivated, prepared using fatty amines as lubricants, is placed in paste form (solids content about 65% by weight, proportion of aliphatic or aromatic solvents about 35% by weight) in stainless steel or plastic vessel, and 2 to 2.5 times the amount of the passivating solution described above are added. The batch is kept at 80° C. and stirred vigorously for about 15 to 25 minutes.

The passivated aluminum pigment is then allowed to settle, the supernatant solution is decanted off, and the passivated pigment is rinsed with tap water until the super-natant solution no longer has a yellow tinge.

The pigment is finally rinsed with distilled water until the electrolyte content of the aluminum pigment is sufficiently low for use in an aqueous base coating composition.

The aluminum pigment thus passivated is incorporated into the aqueous coating compositions described in the illustrative embodiments of European Patent Application EP 89,497. Storage-stable coating compositions were obtained and were processed into two-coat metal-effect paints as described in the experimental part of European Patent Application EP 89,497. The two-coat metal-effect paints obtained exhibited excellent optical and technological properties.

We claim:

1. A water-dilutable coating composition which contains a binder, an aqueous diluent and an aluminum pigment which has been obtained by passivating a lubricant-containing aluminum pigment in an aqueous passivating solution which contains chromic acid and a water-soluble glycol ether of the general formula $R^1$—(—O—$CHR^2$—$CH_2$—)$_n$—OH, wherein $R^1$ represents a lower alkyl radical, $R^2$ represents either an H atom or a lower alkyl radical and n represents a number from 1 to 5, or a water-soluble glycol of the general formula HO—(—$CHR^3$—$CH_2$—O—)$_n$H wherein $R^3$ represents either an H atom or a lower alkyl radical n represents a number from 1 to 5, at not less than 50° C.

2. A water-dilutable coating composition as claimed in claim 1, wherein the lubricant-containing aluminum pigment contains fatty amines.

3. A water-dilutable coating composition as claimed in claim 1 or 2, wherein the aqueous passivating solution contains at least 1.5% by weight of chromic acid and 3 to 30% by weight of water soluble glycol ether or water-soluble glycol.

4. A water-dilutable coating composition as claimed in one claims 1 or 2 wherein the water-soluble glycol ether employed is n-butyl glycol.

5. A water dilutable coating composition as described in claim 1 wherein the lubricant-containing aluminum pigment is passivated at 60°–90° C.

6. A water dilutable coating composition as described in claim 5 wherein the lubricant containing aluminum pigment is passivated at 80° C.

7. A water-dilutable coating composition as described in claim 3 wherein the aqueous passivating solution contains 1.5 to 4.0% by weight chromic acid.

8. The water-dilutable coating composition of claim 7 wherein the aqueous passivating solution contains 2% by weight chromic acid.

9. The water-dilutable coating composition of claim 3 wherein the aqueous passivating solution contains 7–15% by weight of a water soluble glycol ether or a water soluble glycol.

10. The water-dilutable coating composition of claim 3 wherein the aqueous passivating solution contains 10% by weight water-soluble glycol ether or water-soluble glycol.

11. The water-dilutable coating composition of claim 1 wherein $R^2$ represents a methyl group.

12. The water-dilutable coating composition of claim 1 or 11 wherein $R^3$ represents a methyl group.

13. A process for preparing an aluminum pigment which can be employed in water-dilutable coating compositions comprising:

passivating a lubricant-containing aluminum pigment at a temperature of not less than 50° C. in an aqueous passivating solution which contains chromic acid and a water-soluble glycol ether of the general formula $R^1-(-O-CHR_2-CH_2-)_n-OH$, wherein $R^1$ represents a lower alkyl radical; $R^2$ represents either an H atom or a lower alkyl radical, and n represents a number from 1 to 5, or a water-soluble glycol of the general formula $HO-(-CHR^3-CH_2-O-)_nH$ wherein $R^3$ represents either an H atom or a lower alkyl radical and n represents a number from 1 to 5.

14. A process for the preparation of an aluminum pigment as described in claim 13 wherein the lubricant-containing aluminum pigment is passivated at 60°–90° C.

15. A process for the preparation of an aluminum pigment as described in claim 14 wherein the lubricant-containing aluminum pigment is passivated at about 80° C.

16. A process for the preparation of an aluminum pigment as described in claim 13 wherein $R^2$ is methyl.

17. A process for the preparation of an aluminum pigment as described in claim 13 or 16 wherein $R^3$ is methyl.

18. A method of coating a substrate comprising applying to the substrate a water-dilutable coating composition comprised of a binder, an aqueous diluent and an aluminum pigment obtained by passivating a lubricant-containing aluminum pigment at not less than 50° C. in an aqueous passivating solution containing chromic acid and a water soluble glycol ether of the formula:

$$R^1-(-O-CHR^2-CH_2-)_n-OH$$

wherein $R^1$ represents methyl;
$R^2$ represents H or methyl; and
n is a number from 1 to 5;
or a water soluble glycol of the formula:

$$HO-(-CHR^3-CH_2-O-)_n-H$$

wherein $R^3$ is H or methyl and n is a number from 1 to 5.

* * * * *